United States Patent
Lu

(10) Patent No.: US 9,639,321 B2
(45) Date of Patent: May 2, 2017

(54) METHOD AND SYSTEM FOR CONTROLLING THE PLAYBACK OF MULTIMEDIA CONTENT

(71) Applicant: Tencent Technology (Shenzhen) Company Limited, Shenzhen (CN)

(72) Inventor: Sixi Lu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 57 days.

(21) Appl. No.: 14/709,386

(22) Filed: May 11, 2015

(65) Prior Publication Data
US 2015/0242183 A1    Aug. 27, 2015

Related U.S. Application Data

(63) Continuation of application No. PCT/CN2013/084167, filed on Sep. 25, 2013.

(30) Foreign Application Priority Data

Nov. 14, 2012    (CN) .......................... 2012 1 0457152

(51) Int. Cl.
*G06F 17/00* (2006.01)
*G06F 3/16* (2006.01)
(Continued)

(52) U.S. Cl.
CPC .............. *G06F 3/165* (2013.01); *G05B 15/02* (2013.01); *H04N 21/42607* (2013.01);
(Continued)

(58) Field of Classification Search
CPC ........ G06F 3/165; G06F 9/485; G06F 9/5038; G06F 9/5077; G06F 9/5083; G05B 15/02;
(Continued)

(56) References Cited

U.S. PATENT DOCUMENTS

2007/0006238 A1* 1/2007 Finger ..................... G06F 9/485
                                                                           719/328
2007/0223876 A1* 9/2007 Hashimoto .......... G11B 19/025
                                                                           386/241
(Continued)

FOREIGN PATENT DOCUMENTS

CN    101140527 A    3/2008
CN    101778157 A    7/2010
(Continued)

OTHER PUBLICATIONS

Tencent Technology, ISRWO, PCT/CN2013/084167, Jan. 2, 2014, 8 pgs.

(Continued)

*Primary Examiner* — Andrew C Flanders
(74) *Attorney, Agent, or Firm* — Morgan, Lewis & Bockius LLP

(57) ABSTRACT

The present disclosure provides method and system for controlling the playback of multimedia content. The method includes: enumerating currently running multimedia input sources to determine a number of currently running multimedia input sources by calling a system application programming interface (API), each multimedia input source having a corresponding multimedia player; determining, when the number of the currently running multimedia input sources is greater than 1, that the multimedia input sources conflict; and controlling, when the multimedia input sources conflict, a corresponding multimedia player to pause or close so as to remove the conflict. According to the present disclosure, when an audio conflict occurs, a corresponding multimedia player can be automatically paused or closed, or a user can be automatically notified of positions of multimedia players, which greatly improves convenience of oper- (Continued)

ating the multimedia player when the audio conflict occurs and brings better experience to the user.

15 Claims, 3 Drawing Sheets

(51) Int. Cl.
  *H04N 21/426* (2011.01)
  *H04N 21/439* (2011.01)
  *H04N 21/4425* (2011.01)
  *H04N 21/472* (2011.01)
  *G05B 15/02* (2006.01)

(52) U.S. Cl.
  CPC ....... *H04N 21/439* (2013.01); *H04N 21/4425* (2013.01); *H04N 21/47217* (2013.01)

(58) Field of Classification Search
  CPC ........... H04N 21/47217; H04N 21/439; H04N 21/42607; H04N 21/4425
  See application file for complete search history.

(56) References Cited

U.S. PATENT DOCUMENTS

| | | | |
|---|---|---|---|
| 2010/0162276 A1* | 6/2010 | Sim ........................ | G06F 9/5038 719/328 |
| 2011/0161485 A1* | 6/2011 | George ................... | H04L 65/80 709/224 |
| 2013/0204991 A1* | 8/2013 | Skjolsvold ............ | G06F 9/5083 709/223 |
| 2014/0115479 A1* | 4/2014 | Wang .................... | H04L 67/322 715/727 |

FOREIGN PATENT DOCUMENTS

| | | |
|---|---|---|
| CN | 102117221 A | 7/2011 |
| CN | 102496376 A | 6/2012 |
| CN | 102572060 A | 7/2012 |

OTHER PUBLICATIONS

Tencent Technology, IPRP, PCT/CN2013/084167, May 19, 2015, 7 pgs.

* cited by examiner

METHOD AND SYSTEM FOR CONTROLLING THE PLAYBACK OF MULTIMEDIA CONTENT

RELATED APPLICATIONS

This application is a continuation application of PCT Patent Application No. PCT/CN2013/084167, entitled "METHOD AND SYSTEM FOR MONITORING THE PLAYBACK OF MULTIMEDIA CONTENT" filed on Sep. 25, 2013, which claims priority to Chinese Patent Application No. 201210457152.5, filed with the Chinese Patent Office on Nov. 14, 2012 and entitled "METHOD AND SYSTEM FOR MONITORING THE PLAYBACK OF MULTIMEDIA CONTENT", both of which are incorporated by reference in their entirety.

FIELD OF THE TECHNOLOGY

The present disclosure relates to computer technologies, and in particular, to method and system for controlling the playback of multimedia content.

BACKGROUND OF THE DISCLOSURE

When a user simultaneously uses multiple types of multimedia players, an audio conflict is caused, and audiovisual experience is lowered. Therefore, before starting an extra multimedia player, the user needs to manually pause or exit another player.

However, currently, many multimedia players are embedded in web pages. When opening a web page, a user opens a multimedia player in the web page. Especially, when a user opens multiple web pages, among which some web pages are embedded with multimedia players, and some web pages are not embedded with multimedia players, when an audio conflict occurs, the user needs to manually check the web pages one by one, to determine a page of an audio source, and then pause or close the audio, to eliminate the audio conflict. It can be seen that this manner is very inconvenient in operation.

Therefore, a method for intelligently determining an audio conflict and controlling a multimedia player is urgently needed, so as to solve a problem that it is inconvenient to operate the multimedia player when the audio conflict occurs.

SUMMARY

An embodiment of the present disclosure is to provide method and system for controlling the playback of multimedia content, so as to solve a problem that it is inconvenient to operate a multimedia player when an audio conflict occurs.

The present disclosure provides a multimedia playback controlling method, including:

enumerating currently running multimedia input sources to determine a number of currently running multimedia input sources by calling a system application programming interface (API), each multimedia input source having a corresponding multimedia player;

determining, according to the number of the currently running multimedia input sources, whether the multimedia input sources conflict, further including determining, when the number of the currently running multimedia input sources is greater than 1, that the multimedia input sources conflict; and controlling, when the multimedia input sources conflict, a corresponding multimedia player to pause or close so as to remove the conflict.

The present disclosure further provides a computing device having one or more processors, memory and one or more program modules stored in the memory and to be executed by the one or more processors, the one or more program modules further including:

a process monitoring module, configured to enumerate currently running multimedia input sources to determine a number of currently running multimedia input sources by calling a system application programming interface (API), each multimedia input source having a corresponding multimedia player;

a conflict determining module, configured to determine, according to the number of the currently running multimedia input sources, whether the multimedia input sources conflict, further including determining, when the number of the currently running multimedia input sources is greater than 1, that the multimedia input sources conflict; and a control module, configured to control, when the multimedia input sources conflict, a corresponding multimedia player to pause or close so as to remove the conflict.

The present disclosure further provides a non-transitory computer readable storage medium storing a program module group for execution by one or more processors of a computing device having memory for storing programs to be executed by the one or more processors, the program module group further including:

a process monitoring module, configured to enumerate currently running multimedia input sources to determine a number of currently running multimedia input sources by calling a system application programming interface (API), each multimedia input source having a corresponding multimedia player;

a conflict determining module, configured to determine, according to the number of the currently running multimedia input sources, whether the multimedia input sources conflict, further including determining, when the number of the currently running multimedia input sources is greater than 1, that the multimedia input sources conflict; and a control module, configured to control, when the multimedia input sources conflict, a corresponding multimedia player to pause or close so as to remove the conflict.

In the present disclosure, when a multimedia conflict occurs, a corresponding multimedia player can be automatically paused or closed, or a user can be automatically notified of positions of multimedia players, and the user is instructed to manually close or pause a corresponding multimedia player, which greatly improves convenience of operating the multimedia player when the multimedia conflict occurs and brings better experience to the user.

The foregoing description is merely an overview of the technical solutions of the present disclosure. In order to understand the technical means of the present disclosure more clearly, implementation can be performed according to content of the specification. Moreover, to make the foregoing and other objectives, features, and advantages of the present disclosure more comprehensible, description is made below in detail by using preferred embodiments and with reference to the accompanying drawings.

DESCRIPTION OF EMBODIMENTS

To further explain the technical means used in the present disclosure for achieving the intended objectives and the effects thereof, method and system for controlling the playback of multimedia content, and specific implementation manners, methods, steps, and effects thereof are described below in detail with reference to the accompanying drawings and preferred embodiments.

The foregoing and other technical content, features, and effects of the present disclosure can be clearly presented below in detailed description with reference to preferred embodiments of the reference drawings. The technical means used in the present disclosure for achieving the intended objectives and the effects thereof can be further and specifically learnt according to descriptions of specific implementation manners. However, the accompanying drawings are for reference and description only, and are not intended to limit the present disclosure.

Figure 1:
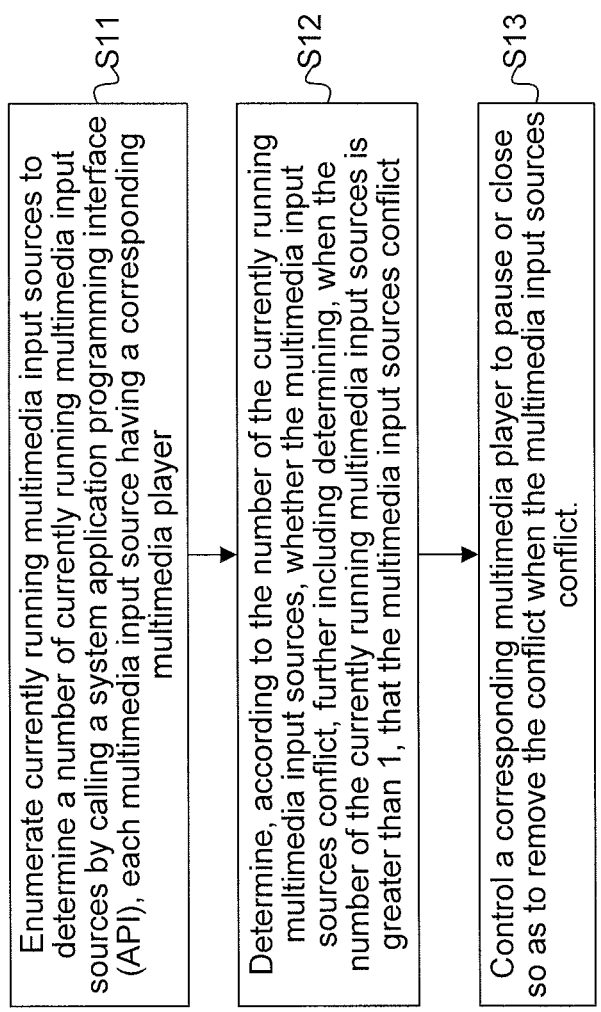
FIG. 1 is a flowchart of a multimedia playback controlling method according to an embodiment of the present disclosure.

According to the multimedia playback controlling method and system in the present disclosure, a problem of a conflict among multiple players can be solved by monitoring multimedia input sources, which is not only applicable to video monitoring, but also applicable to audio monitoring. The present disclosure is specifically described below by using audio monitoring as an example. Refer to FIG. 1, which is a flowchart of a multimedia playback controlling method according to an embodiment of the present disclosure. The method includes the following steps:

S11: Enumerate currently running multimedia input sources to determine a number of currently running multimedia input sources by calling a system API, each multimedia input source having a corresponding multimedia player.

An API is a predefined function, and an objective of the API is to provide an interface for software, so as to support performing of system functions by the software. That is, a development engineer compiles a monitoring program in advance, and monitors a system process by calling the API. For example, for a windows platform, all audio streams that are currently being played are enumerated by calling an interface function, that is, windows API IAudioSessionManager2 (an audio session management function of the API).

S12: Determine, according to the number of the currently running multimedia input sources, whether the multimedia input sources conflict. More specifically, when the number of the running multimedia input sources enumerated in step S11 is greater than 1, it is determined that a conflict exists.

S13: Control, when multiple audio input sources conflict, a corresponding multimedia player to pause or close so as to remove the conflict.

An audio input source may be associated with independent multimedia player software, or come from a multimedia player embedded in a web page. When at least two audio input sources appear, an audio conflict occurs, and a corresponding multimedia player needs to be paused or closed. Because there are many types of multimedia players, different types of multimedia players have different program control principles. An action of automatically pausing a multimedia player needs to be implemented by compiling corresponding code by technical personnel, while a manufacturer of one multimedia player usually only knows control principles of multimedia players of a same type (for example, company A usually can only perform compilation on related multimedia players belonging to the company). Therefore, a specific control action in the present disclosure is preferably performed according to whether conflicting multimedia players belong to a same type.

Specifically, an IAudioSessionControl2 object (a session control object) may be first acquired by calling an IAudioSessionManager2 function (an audio session management function of the API) of the API, an ID of a process is acquired by using a GetProcessId function (a process acquiring function) of the IAudioSessionControl2 object, then a name of the process is acquired by using GetModuleBaseName (a name acquiring function), and it is determined, by comparing whether names of processes corresponding to multimedia players belong to a same type, whether the currently running multimedia players are multimedia players of a same type. Definitely, in addition to names of processes, a type of a player can also be determined by comparing other process information.

For example, when processes of multimedia players are multiple running instances of a same multimedia player, it is determined that these multimedia players are of a same type.

The control action may be classified into the following three types:

(1) When multiple conflicting audio input sources are associated with a same type of multimedia player, all other multimedia players except a last running multimedia player are paused or closed by calling the system API through the external control (for example, when a conflict occurs, a player is directly controlled to pause or close by calling an interface, that is, a COM interface or an instruction parameter interface). Pausing or closing all other multimedia players except the last running multimedia player is a preferred implementation manner repeatedly used in this embodiment. Definitely, one of the multimedia players may also be reserved according to presetting, and other multimedia players are closed.

(2) When conflicting multimedia input sources are associated with different types of multimedia players, all other multimedia players except the last running multimedia player are closed by calling a termination function (TerminateProcess API) of the system API.

(3) When conflicting multiple audio input sources are associated with different types of multimedia players, the process information of the multimedia players is provided to instruct a user to pause or close a corresponding multimedia player. For example, the process information of the currently running multimedia players is enumerated, and the user is prompted with the process information of the currently running multimedia players in a displaying manner and the like.

If the multimedia player is closed in a system process in manner (2), data in the player may be lost, and therefore, when multiple audio input sources conflict, it is reliable to select manner (3), and an audio conflict may be eliminated in a targeted manner according to a user intention.

According to the multimedia playback controlling method in the present disclosure, when a multimedia conflict occurs, a corresponding multimedia player can be automatically paused or closed, or a user is automatically notified of positions of multimedia players, and the user is instructed to manually close or pause a corresponding multimedia player, which greatly improves convenience of operating the multimedia player when an audio conflict occurs.

Figure 2:
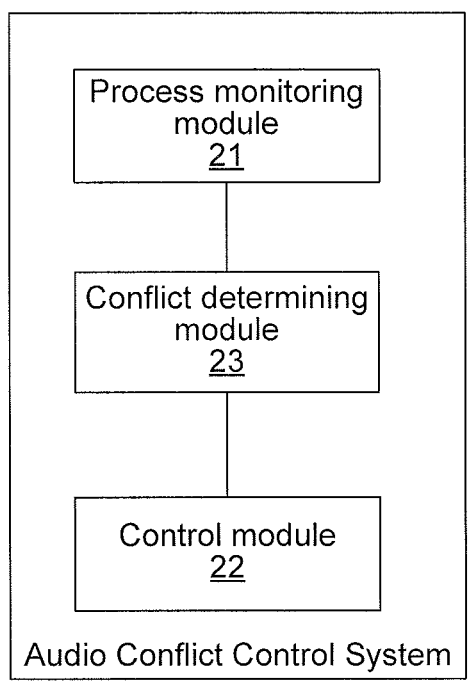
FIG. 2 is a structural diagram of a multimedia playback controlling system according to an embodiment of the present disclosure.

The present disclosure further provides a multimedia playback controlling system. Referring to FIG. 2, the multimedia playback controlling system includes a process monitoring module 21, a control module 22, and a conflict determining module 23. The process monitoring module 21 is configured to enumerate currently running audio input sources to determine a number of currently running multimedia input sources by calling a system API (for example, by calling an API IAudioSessionManager2, that is, an audio session management function of an API). The monitoring module 21 transmits information about the enumerated audio input sources to the conflict determining module 23 in real time. The conflict determining module 23 determines, according to the number of the currently running audio input sources, whether the audio input sources conflict. Generally, if the number of the enumerated running audio input sources is greater than 1, it is determined that a conflict exists. If determining that existence of at least two audio input sources causes the audio conflict, the conflict determining module 23 sends a signal of the audio conflict to the control module 22, and the control module 22 controls a corresponding multimedia player to pause or close, so as to eliminate the system audio conflict.

The audio input source may be associated with independent multimedia player software, or may be generated by a multimedia player embedded in a web page. When the audio conflict occurs, the control module 22 may directly control, by using the system process, close of all other multimedia players except the last running multimedia player, and in this way, only the last running multimedia player runs normally, that is, the audio conflict is eliminated.

Figure 3:
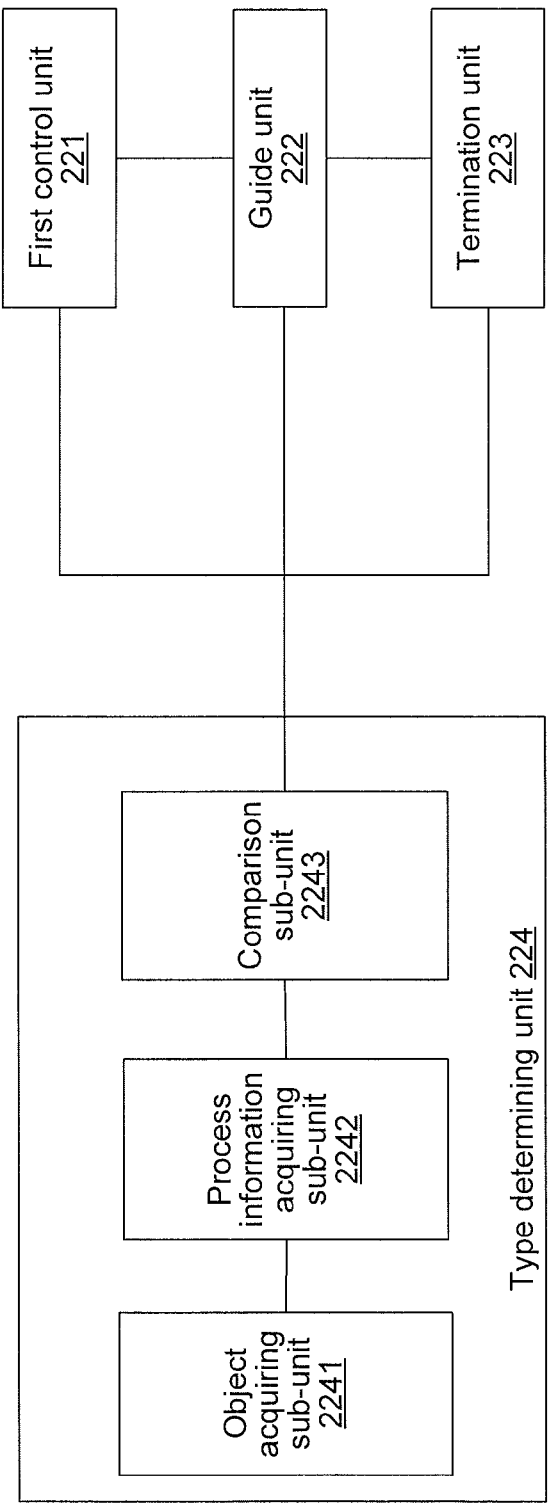
FIG. 3 is a structural diagram of a control module of the multimedia playback controlling system according to an embodiment of the present disclosure.

In some embodiments, closing a multimedia player may cause data loss. Therefore, the control module 22 may further eliminate the audio conflict in another reliable manner. Refer to FIG. 3, which is a structural diagram of a control module 22 according to an embodiment of the present disclosure. The control module 22 includes a first control unit 221, a guide unit 222, a termination unit 223, and a type determining unit 224, where the type determining unit 224 further includes an object acquiring subunit 2241, a process information acquiring subunit 2242, and a comparison subunit 2243.

Because there are many types of multimedia players, different types of multimedia players have different program control principles. An action of automatically pausing or closing a multimedia player needs to be implemented by compiling corresponding code by technical personnel, while a manufacturer of one multimedia player usually only knows control principles of multimedia players of a same type (for example, company A usually can only perform compilation on related multimedia players belonging to the company). Therefore, a development engineer of the system in the present disclosure always can only perform coding control on multimedia players of one type.

Therefore, when the conflict determining module 23 determines that multiple audio input sources conflict, a specific control action may be performed according to whether the conflicting multimedia players belong to a same type. The type determining unit 224 first determines whether the running multimedia input sources are associated with a same type of multimedia player. Specifically, the object acquiring subunit 2241 acquires a session control object (IAudioSessionControl2) by calling a system API (for example, by calling an IAudioSessionManager2 function, that is, an audio session management function of an API). Then, the process information acquiring subunit 2242 obtains process information of running multimedia players by using a process acquiring function (GetProcessId) of the session control object (for example, obtains a name of a process by calling a GetModuleBaseName function). Then, the comparison subunit 2243 determines, by comparing the process information, whether the currently running multimedia players are multimedia players of the same type.

When the type determining unit 224 determines that the running multimedia input sources are associated with a same type of multimedia player, the first control subunit 221 pauses or closes a corresponding multimedia player by calling the system API (for example, by calling a COM interface or an instruction parameter interface) through external control.

When the type determining unit 224 determines that the running multimedia input sources are associated with different types of multimedia players, the guide unit 222 enumerates and prompts process information of the currently running multimedia players, and instructs the user to pause or close a corresponding multimedia player. Alternatively, the termination unit 223 terminates a corresponding multimedia player by calling a termination function (TerminateProcess API) of the system API.

When the method for controlling the playback of multimedia content is implemented in a form of software function modules and sold or used as an independent product, the method may also be stored in a non-transitory computer readable storage medium for execution by one or more processors of a computing device. A person of ordinary skill in the art may understand that all or some of the processes in the methods of the foregoing embodiments may be implemented by a computer program instructing relevant hardware. The program may be stored in a non-transitory computer readable storage medium. When executed by the processor, the program may include processes of the embodiments of all the foregoing methods. The storage medium may be a magnetic disk, an optical disc, a read-only memory (ROM), a random access memory (RAM), or the like.

The above descriptions are merely preferred embodiments of the present disclosure, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A method for controlling the playback of multimedia content, comprising:
    at a computing device having one or more processors and memory for storing program modules to be executed by the one or more processors:
        enumerating currently running multimedia input sources to determine a number of currently running multimedia input sources by calling a system application programming interface (API), each multimedia input source having a corresponding multimedia player;
        determining, according to the number of the currently running multimedia input sources, whether the multimedia input sources conflict, further including determining, when the number of the currently running multimedia input sources is greater than 1, that the multimedia input sources conflict; and controlling, when the multimedia input sources conflict, a corresponding multimedia player to pause or close so as to remove the conflict, further comprising:

determining whether conflicting multimedia input sources are associated with a same type of multimedia player; and when the conflicting multimedia input sources are associated with the same type of multimedia player, pausing or closing the corresponding multimedia player by calling the system API through external control.

2. The method according to claim 1, wherein the step of controlling the corresponding multimedia player to pause or close further comprises:

when the conflicting multimedia input sources are associated with different types of multimedia players, enumerating and prompting process information of currently running multimedia players.

3. The method according to claim 1, wherein the step of controlling the corresponding multimedia player to pause or close further comprises:

when the conflicting multimedia input sources are associated with different types of multimedia players, terminating the corresponding multimedia players by calling a termination function of the system API.

4. The method according to claim 1, wherein the step of determining whether the conflicting multimedia input sources are associated with a same type of multimedia player further comprises:

acquiring a session control object by calling the system API;

obtaining process information of the currently running multimedia players by using a process acquiring function of the session control object; and determining, by comparing the process information, whether the currently running multimedia players are multimedia players of the same type.

5. The method according to claim 1, wherein the multimedia players corresponding to the multimedia input sources are embedded in web pages.

6. A computing device having one or more processors, memory and one or more programs stored in the memory and to be executed by the one or more processors, the one or more programs further including instructions for:

enumerating currently running multimedia input sources to determine a number of currently running multimedia input sources by calling a system application programming interface (API), each multimedia input source having a corresponding multimedia player;

determining, according to the number of the currently running multimedia input sources, whether the multimedia input sources conflict, further including determining, when the number of the currently running multimedia input sources is greater than 1, that the multimedia input sources conflict; and controlling, when the multimedia input sources conflict, a corresponding multimedia player to pause or close so as to remove the conflict, further comprising:

determining whether conflicting multimedia input sources are associated with a same type of multimedia player; and when the conflicting multimedia input sources are associated with the same type of multimedia player, pausing or closing the corresponding multimedia player by calling the system API through external control.

7. The computing device according to claim 6, wherein the one or more programs further comprise instructions for:

enumerating and prompting process information of currently running multimedia players when the conflicting multimedia input sources are associated with different types of multimedia players.

8. The computing device according to claim 6, wherein the one or more programs further comprise instructions for:

terminating the corresponding multimedia players by calling a termination function of the system API when the conflicting multimedia input sources are associated with different types of multimedia players.

9. The computing device according to claim 6, wherein the one or more programs further comprise instructions for:

acquiring a session control object by calling the system API;

obtaining process information of the currently running multimedia players by using a process acquiring function of the session control object; and determining, by comparing the process information, whether the currently running multimedia players are multimedia players of the same type.

10. The computing device according to claim 6, wherein the multimedia players corresponding to the multimedia input sources are embedded in web pages.

11. A non-transitory computer readable storage medium storing one or more programs for execution by one or more processors of a computing device having memory for storing the one or more programs, the one or more programs further including instructions for:

enumerating currently running multimedia input sources to determine a number of currently running multimedia input sources by calling a system application programming interface (API), each multimedia input source having a corresponding multimedia player;

determining, according to the number of the currently running multimedia input sources, whether the multimedia input sources conflict, further including determining, when the number of the currently running multimedia input sources is greater than 1, that the multimedia input sources conflict; and controlling, when the multimedia input sources conflict, a corresponding multimedia player to pause or close so as to remove the conflict, further comprising:

determining whether conflicting multimedia input sources are associated with a same type of multimedia player; and when the conflicting multimedia input sources are associated with the same type of multimedia player, pausing or closing the corresponding multimedia player by calling the system API through external control.

12. The non-transitory computer readable storage medium according to claim 11, wherein the one or more programs further comprise instructions for:

enumerating and prompting process information of currently running multimedia players when the conflicting multimedia input sources are associated with different types of multimedia players.

13. The non-transitory computer readable storage medium according to claim 11, wherein the one or more programs further comprise instructions for:

terminating the corresponding multimedia players by calling a termination function of the system API when the conflicting multimedia input sources are associated with different types of multimedia players.

14. The non-transitory computer readable storage medium according to claim 11, wherein the one or more programs further comprise instructions for:
  acquiring a session control object by calling the system API;
  obtaining process information of the currently running multimedia players by using a process acquiring function of the session control object; and
  determining, by comparing the process information, whether the currently running multimedia players are multimedia players of the same type.

15. The non-transitory computer readable storage medium according to claim 11, wherein the multimedia players corresponding to the multimedia input sources are embedded in web pages.

* * * * *